United States Patent
Maruyama et al.

(10) Patent No.: US 8,541,123 B2
(45) Date of Patent: Sep. 24, 2013

(54) SECONDARY BATTERY, BATTERY ASSEMBLY, AND VEHICLE EQUIPPED WITH THE SECONDARY BATTERY

(75) Inventors: Noriyuki Maruyama, Toyota (JP); Yuta Nemoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 794 days.

(21) Appl. No.: 12/632,842

(22) Filed: Dec. 8, 2009

(65) Prior Publication Data

US 2010/0151302 A1 Jun. 17, 2010

(30) Foreign Application Priority Data

Dec. 16, 2008 (JP) ................................. 2008-319980

(51) Int. Cl.
*H01M 2/00* (2006.01)
(52) U.S. Cl.
USPC ............................................ 429/94; 429/163
(58) Field of Classification Search
USPC .......................................................... 429/94
See application file for complete search history.

(56) References Cited

U.S. PATENT DOCUMENTS 6,662,891 B2 * 12/2003 Misu et al. ................... 180/68.1

FOREIGN PATENT DOCUMENTS

| JP | 2000-100404 | 4/2000 |
|---|---|---|
| JP | 2001-068166 | 3/2001 |
| JP | 2002-313430 | 10/2002 |
| JP | 2004-227788 | 8/2004 |
| JP | 2005-174680 | 6/2005 |
| JP | 2008-108457 | 5/2008 |
| KR | 10-0669435 | 1/2007 |

OTHER PUBLICATIONS

English translation of KR10-2006-0106373.*

* cited by examiner

*Primary Examiner* — Maria J Laios
(74) *Attorney, Agent, or Firm* — Finnegan, Henderson, Farabow, Garrett & Dunner, LLP (57) ABSTRACT

A secondary battery comprises a flat wound electrode body, a flat-type hard case housing the wound electrode body, and a film sandwiched between them. The film is formed with thick portions each of which is located at a boundary region between a flat portion and a curved portion of the surface of the wound electrode body. When a plurality of the secondary batteries are bound, therefore, load is applied widely on almost the entire wound electrode body, thereby enabling exertion of sufficient generation capability. Thus, a secondary battery with improved battery performance is provided in which load is sufficiently applied on an electrode body. The secondary battery can also be used as a battery assembly, a battery to be mounted on a vehicle, and a battery to be mounted on a battery mounting device.

4 Claims, 10 Drawing Sheets

PRIOR ART

FIG.16

PRIOR ART

SECONDARY BATTERY, BATTERY ASSEMBLY, AND VEHICLE EQUIPPED WITH THE SECONDARY BATTERY

TECHNICAL FIELD

The present invention relates to a secondary battery and an battery assembly including the secondary batteries and, more particularly, to a flat-type secondary battery configured such that binding load is appropriately applied on an electrode body to provide improved battery performance, an battery assembly including the secondary batteries, and a vehicle equipped with the secondary battery.

BACKGROUND ART

Heretofore, a rechargeable secondary battery such as a lithium ion battery has been available for e.g. power supply to an in-vehicle equipment of a vehicle, a power source of a battery mounting device, etc. The secondary battery generally includes a power generating element constituted of a wound electrode body made by winding positive and negative electrode sheets and separator sheets in laminated relation and impregnating them with electrolyte. The secondary battery is normally configured such that the wound electrode body is hermetically sealed in a case. As a winding manner of the wound electrode body, there are flat winding, cylindrical winding, and others. The shape of the case depends on the winding manner. A case for a flat wound electrode body has a flat shape.

In some cases, plural secondary batteries are assembled to provide a battery assembly in order to comply with the details of electric power required by a power supply destination. In the case of assembling the flat-type secondary batteries into a battery assembly, the secondary batteries are arranged in a direction of thickness of each battery and entirely bound into one unit by an appropriate binding member. In this bound state, each of the secondary batteries is pressed in the thickness direction. It has been known that appropriate application of the pressing load on the wound electrode bodies is important in power generation capability of the secondary batteries. An example of such secondary battery is disclosed in for example Patent Literature 1.

CITATION LIST

Patent Literature
Patent Literature 1: JP-A-2004-227788

SUMMARY OF INVENTION

Technical Problem

However, the above conventional secondary battery has the following disadvantages. To be specific, actually, the load could not be applied well on the wound electrode body. This could not exhibit sufficient battery performance. Accordingly, the performance of a vehicle equipped with the battery and a battery mounting device could not be exerted well. Such problem may be due to deformation of the case caused by binding load.

Figure 14:
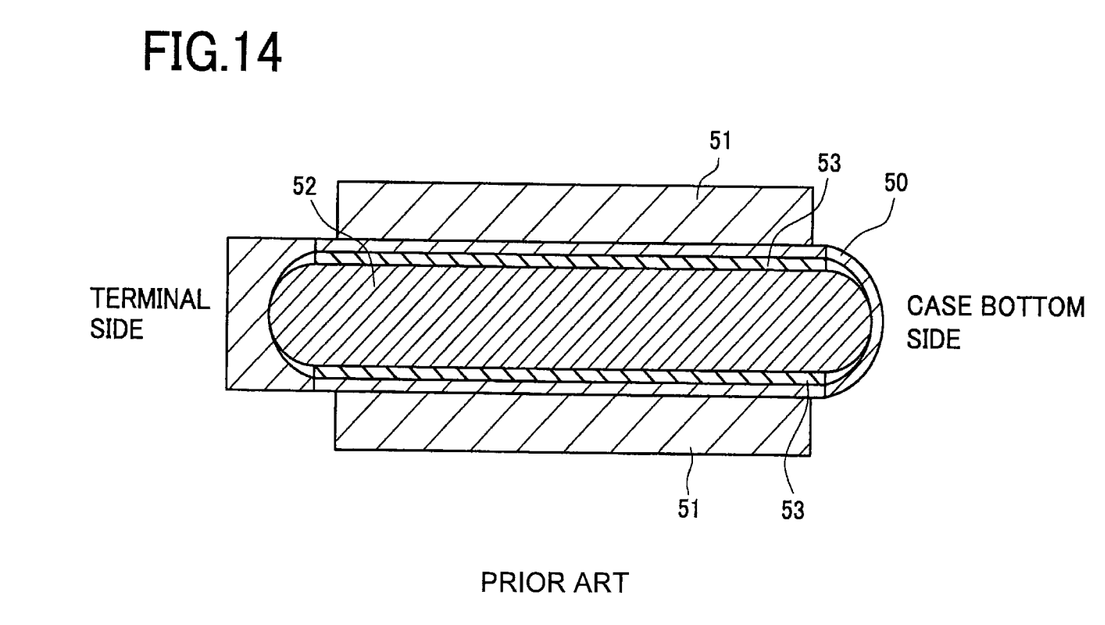
FIG. 14 is a cross sectional view of a conventional secondary battery under load.

FIG. 14 shows a cross sectional view of the secondary battery under load in the thickness direction. As shown in FIG. 14, flat portions of both side surfaces of a case 50 of the secondary battery are pressed by pressing members 51. Thus, the case 50 is deformed with slight collapse in a vertical direction in FIG. 14, thereby exerting load on a wound electrode body 52. Herein, the collapse degree of the case 50 is not uniform. That is, the center of each flat portion in a width direction (in a lateral direction in FIG. 14) is collapsed to a certain degree, whereas each flat portion is hardly collapsed in the vicinity of both ends. Both ends or the vicinity provide higher rigidity than the center owing to the lid portion and the bottom portion of the case 50.

Figure 15:
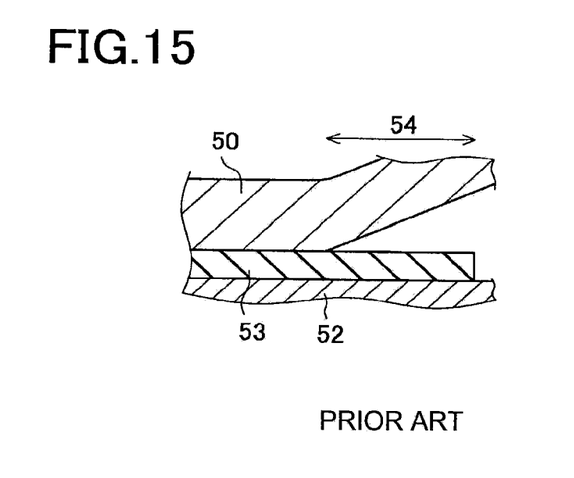
FIG. 15 is a cross sectional view showing that a range on which no load is applied occurs in the wound electrode body due to case deformation.

Therefore, as shown in an enlarged view of FIG. 15, a region 54 with a slight gap can occur between the case 50 (or a spacer 53) and the wound electrode body 52. This region 54 is present on both upper and lower surfaces of the case 50 near both ends in the lateral direction in FIG. 14. No load is naturally applied on a portion of the wound electrode body 52 covered by the region 54 of the case 50. Thus, the load on the wound electrode body 52 is insufficient. It is to be noted that in FIG. 15 the deformation of the case 50 is more exaggerated than actual.

Figure 16:
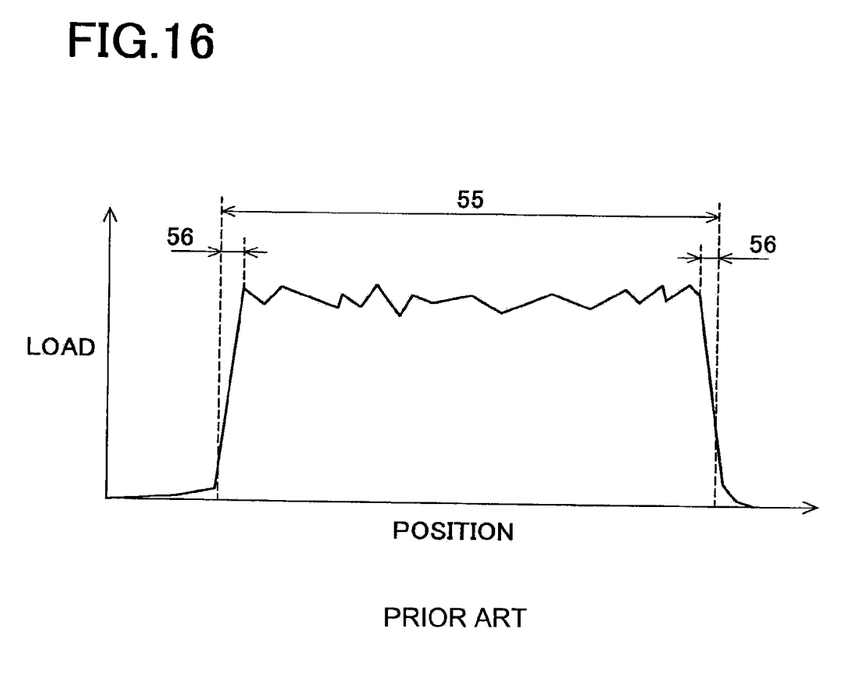
FIG. 16 is a graph showing load distribution on the wound electrode body in the conventional secondary battery.

Due to the above region 54, load distribution on the wound electrode body 52 is as shown in a graph in FIG. 16. In this graph, a lateral axis represents the position in the lateral direction in FIG. 14. A range indicated by "55" in FIG. 16 is a range of the wound electrode body 52 on which load needs to be applied. This range substantially corresponds to a range of the wound electrode body 52 on which the pressing members 51 are placed in FIG. 14. The load distribution in FIG. 16 shows that insufficient load ranges 56 occur on both ends of the load needing range 55. The ranges 56 correspond to the aforementioned region 54. Since the ranges 56 occur as above, the load on the entire load needing range 55 is insufficient.

Incidentally, the graph in FIG. 16 shows variation in load according to positions even in the range 55. This variation derives from the structure of the pressing members 51. Even though the pressing members 51 are illustrated in simple form in FIG. 14, they actually have the shape like comb teeth allowing air pass through for cooling property. This causes the load variation as seen in FIG. 16. Such a small variation will not cause any problem in battery performance.

The present invention has been made to solve the above problems and has a purpose to provide a secondary battery configured such that sufficient load is applied on an electrode body for improved battery performance, a battery assembly including the secondary battery, and a vehicle equipped with the secondary battery.

Solution to Problem

To achieve the above purpose, one aspect of the present invention provides a secondary battery comprising: an electrode body; a flat-type case that houses the electrode body; and a compressing member that is located between an inner surface of the case and the electrode body and presses part of a surface of the electrode body. The compressing member may be a third member separate from the electrode body and the flat case and may be integral with the inner surface of the flat case. Because of this compressing member, load can be applied on a wider area of the electrode body and therefore battery performance can be exhibited sufficiently.

Advantageous Effects of Invention

According to the invention, the load can be exerted on the electrode body sufficiently, so that the secondary battery with improved battery performance and the battery assembly including such secondary battery can be provided.

DESCRIPTION OF EMBODIMENTS

Figure 1:
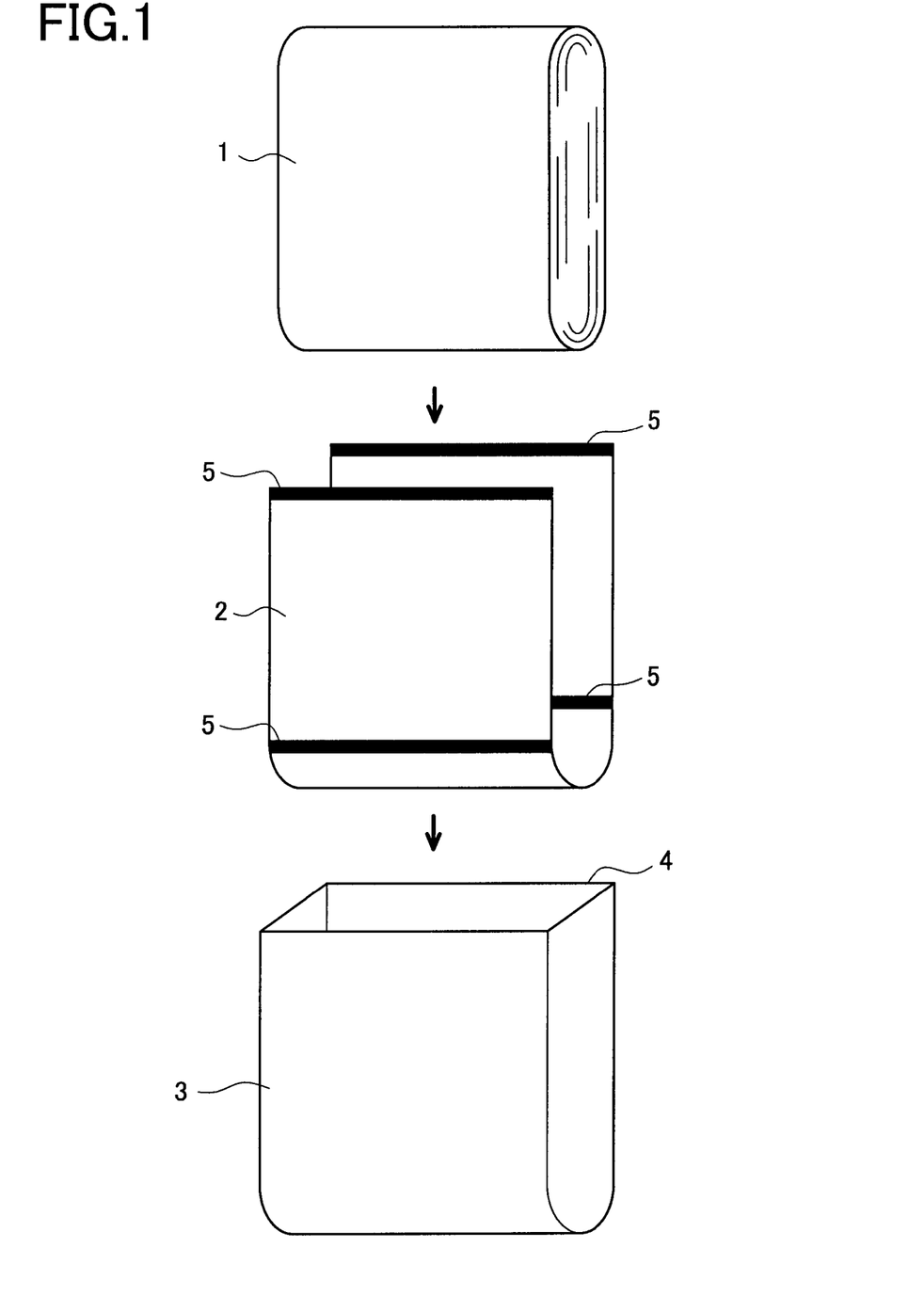
FIG. 1 is an exploded perspective view of a secondary battery in an embodiment.

A detailed description of a preferred embodiment of the present invention will now be given referring to the accompanying drawings. A secondary battery of this embodiment is basically a lithium ion secondary battery including a wound electrode body 1 hermetically sealed in a hard case (hereinafter, simply referred to as a "case") 3 made of metal or hard resin as shown in FIG. 1.

The wound electrode body 1 is formed of positive and negative electrode sheets and separator sheets that are laminated and wound in flat form. A film 2 for thickness adjustment is wrapped around the wound electrode body 1 and they are inserted in the case 3. This case 3 is a flat case forming the outer shape of the secondary battery. The film 2 is sandwiched between the inner surface of the case 3 and the wound electrode body 1. If the case 3 is made of metal, the film 2 also serves as an insulator between the wound electrode body 1 and the case 3. Further, the wound electrode body 1 is impregnated with electrolyte. After the wound electrode body 1 and the film 2 are inserted into the case 3, terminals are attached and an opening 4 of the case 3 is closed.

Figure 2:
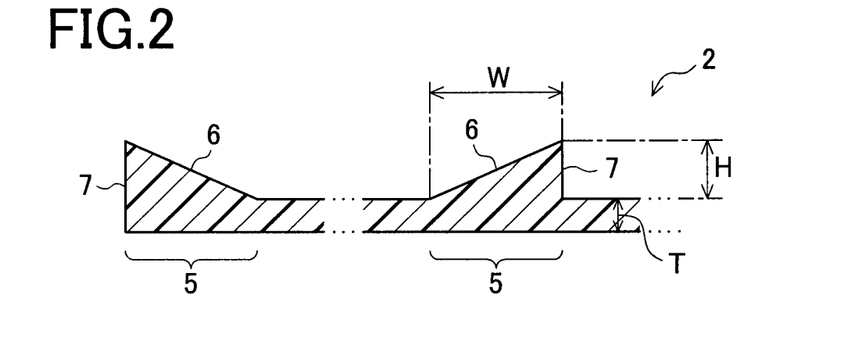
FIG. 2 is an enlarged cross sectional view showing the shape of a thick portion of a film.

The film 2 is provided with four thick portions 5. Each thick portion 5 is formed in a linear pattern and with a thickness larger than other portions of the film 2 (about 100 μm). FIG. 2 shows a cross section of the thick portions 5. Each thick portion 5 in FIG. 2 is of a cross section like a ridge raised from one surface of the film 2. To be concrete, the raised surface of each thick portion 5 includes a slant surface 6 and a vertical surface 7.

Height H of the raised portion of the thick portion 5 is appropriately determined in a range of 0.5 to 1.5 times the other portions than the thick portions 5. If the height H is too low, the thick portion 5 produces little effect. If it is too high, inversely, the thick portion 5 is likely to apply excessive large load on the wound electrode body 1 and instead the load on the flat portions decreases. Furthermore, width W of each thick portion 5 is preferably about 5 mm.

Figure 3:
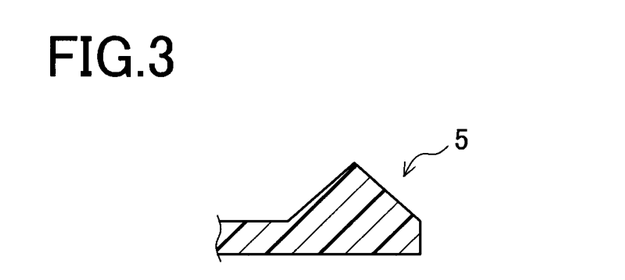
FIG. 3 is an enlarged cross sectional view showing a first modified example of the thick portion.
Figure 4:
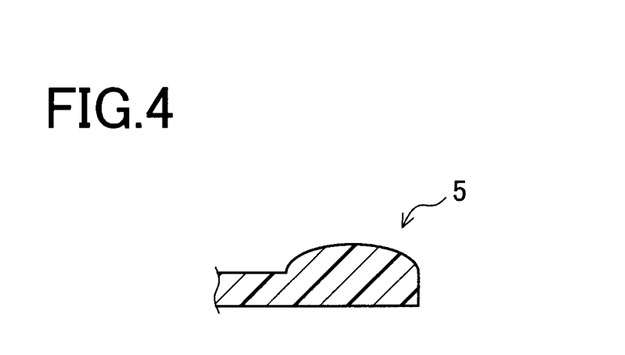
FIG. 4 is an enlarged cross sectional view showing a second modified example of the thick portion.

The raised surface of each thick portion 5 (an upper surface in FIG. 2) of the film 2 is to face the inner surface of the case 3, not the wound electrode body 1, when the film 2 is set in the secondary battery. However, this orientation may be reversed. The cross sectional shape of each thick portion 5 is not limited to that shown in FIG. 2 and may be made as shown in FIG. 3 or 4. As another alternative, each 55 may be formed with raised portions on both surfaces.

Figure 5:
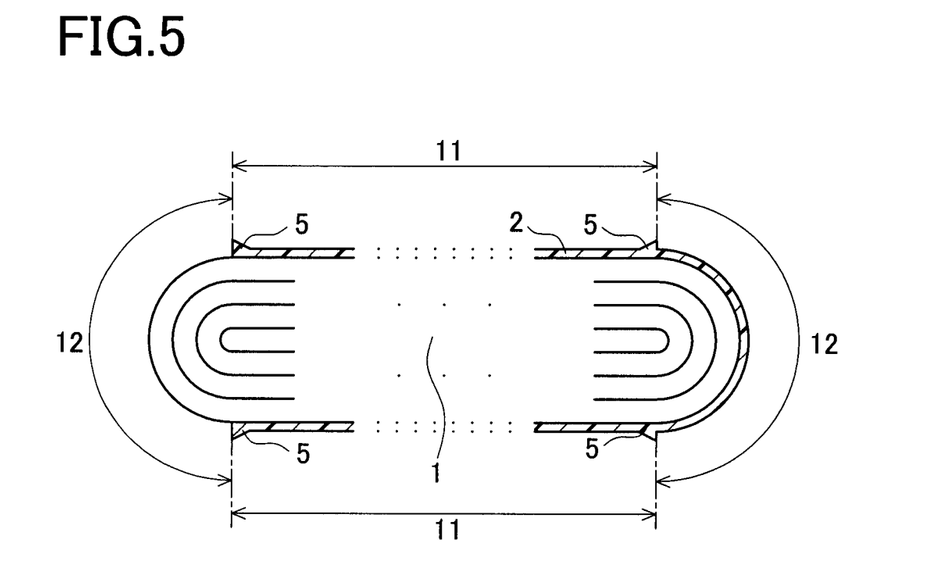
FIG. 5 is a cross sectional view showing a relationship between the outer shape of a wound electrode body and the location of the thick portion in the secondary battery.

When the film 2 is set in the secondary battery, each thick portion 5 of the film 2 is located at a boundary region between a flat portion 11 and a curved portion 12 of the outer shape of the wound electrode body 1 as shown in FIG. 5. In FIG. 5, specifically, each thick portion 5 is located at an end of the flat portion 11 adjoining to the curved portion 12. However, the thick portion 5 may be provided at an end of the curved portion 12 adjoining to the flat portion 11 or may be placed across the boundary between the flat portion 11 and the curved portion 12.

Figure 6:
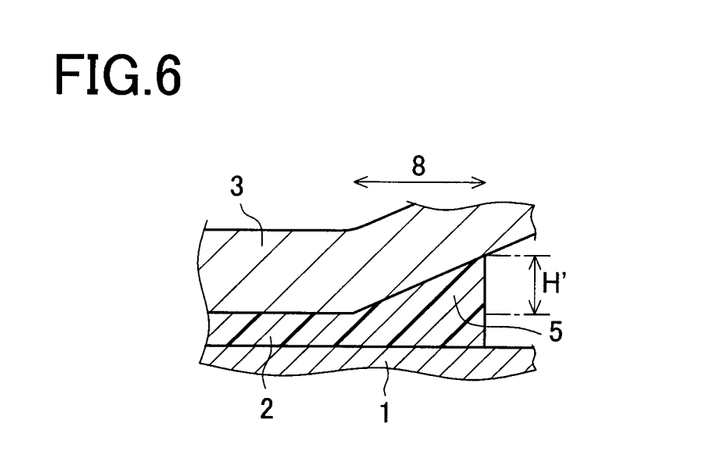
FIG. 6 is an enlarged cross sectional view showing the thick portion and the vicinity in the secondary battery under load.

FIG. 6 shows a part of the secondary battery incorporating the film 2 under binding load by a binding member. FIG. 6 corresponds to FIG. 15 showing a conventional one. Comparing FIGS. 6 and 15, the following differences are found. To be concrete, in FIG. 15 having no thick portion 5, the gap forming region 54 occurs where no load is applied on the wound electrode body 52 as mentioned above.

However, in FIG. 6 having the thick portion 5, sufficient load is applied on the wound electrode body 1 under even a region 8 corresponding to the region 54 of FIG. 15. This is because, even if the case 3 is deformed by pressure, the wound electrode body 1 and the film 2 are in close contact with each other and the film 2 (specifically, the thick portions 5) and the inner surface of the case 3 are also in close contact with each other. In other words, owing to the presence of the thick portions 5, the part of the wound electrode body 1, corresponding to the gap forming region 54 in the conventional secondary battery, can be pressed sufficiently.

Figure 7:
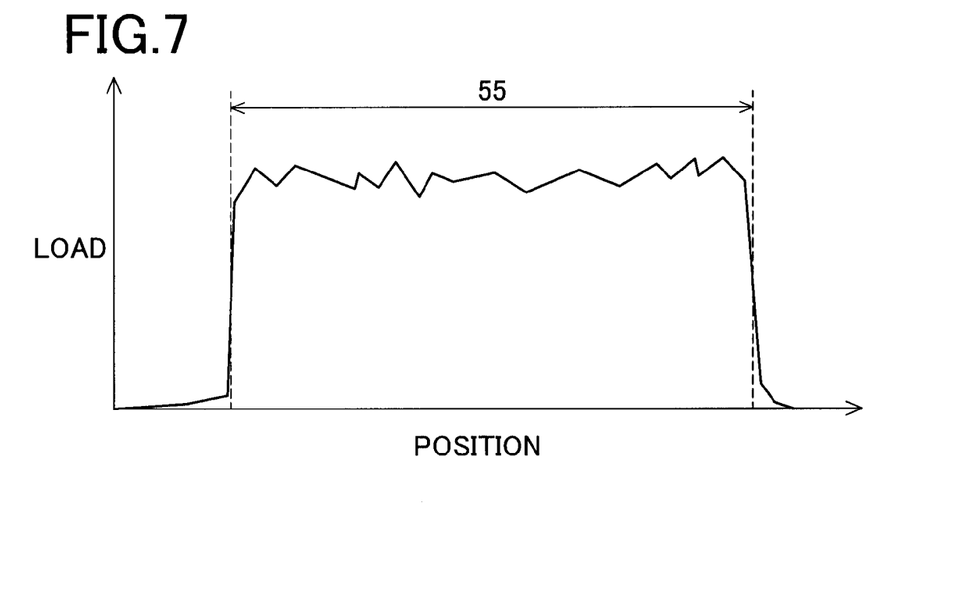
FIG. 7 is a graph showing load distribution on the wound electrode body in the secondary battery.

FIG. 7 is a graph showing load distribution on the wound electrode body 1 of the secondary battery in this embodiment. As compared with the load distribution in the conventional secondary battery shown in FIG. 16, FIG. 7 reveals that the insufficient load ranges 56 have substantially disappeared from both ends of the load needing range 55. In other words, almost the entire load needing range 55 is under desired load. This is of course an effect resulting from the presence of the thick portions 5 themselves. In the secondary battery of this embodiment, accordingly, inherent power generation capability of the wound electrode body 1 can be sufficiently exhibited. Because load shortage due to the occurrence of the gap forming region is not caused.

Figure 8:
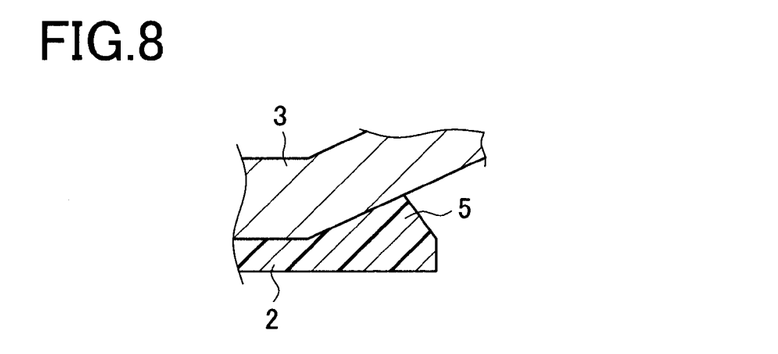
FIG. 8 is a partial enlarged cross sectional view showing that a thick portion of a first modified example is under load.
Figure 9:
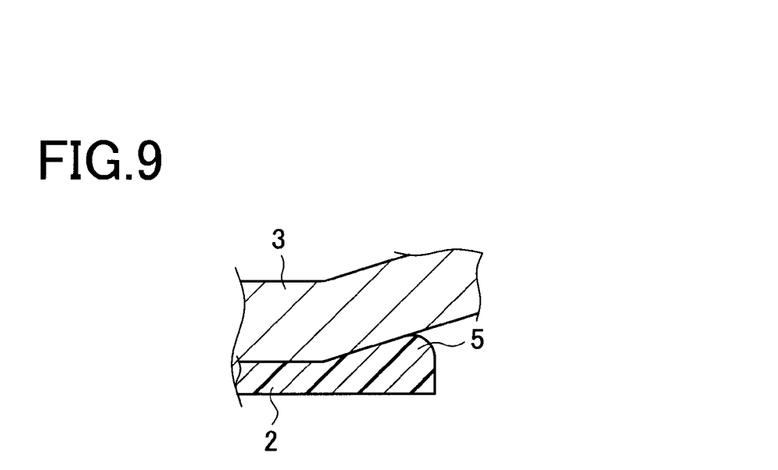
FIG. 9 is a partial enlarged cross sectional view showing that a thick portion of a second modified example is under load.

Each thick portion 5 under load in FIG. 6 is slightly compressed or deformed by pressure. To be specific, the height H' of the thick portion 5 in FIG. 6 is somewhat lower than the original height H shown in FIG. 2. The same applies to the thick portions 5 having a cross sectional shape of FIG. 3 or FIG. 4. Their cross sectional views under load are shown in FIGS. 8 and 9. In FIGS. 8 and 9, similarly, the height of the thick portion 5 is somewhat lower than those in FIGS. 3 and 4.

Figure 10:
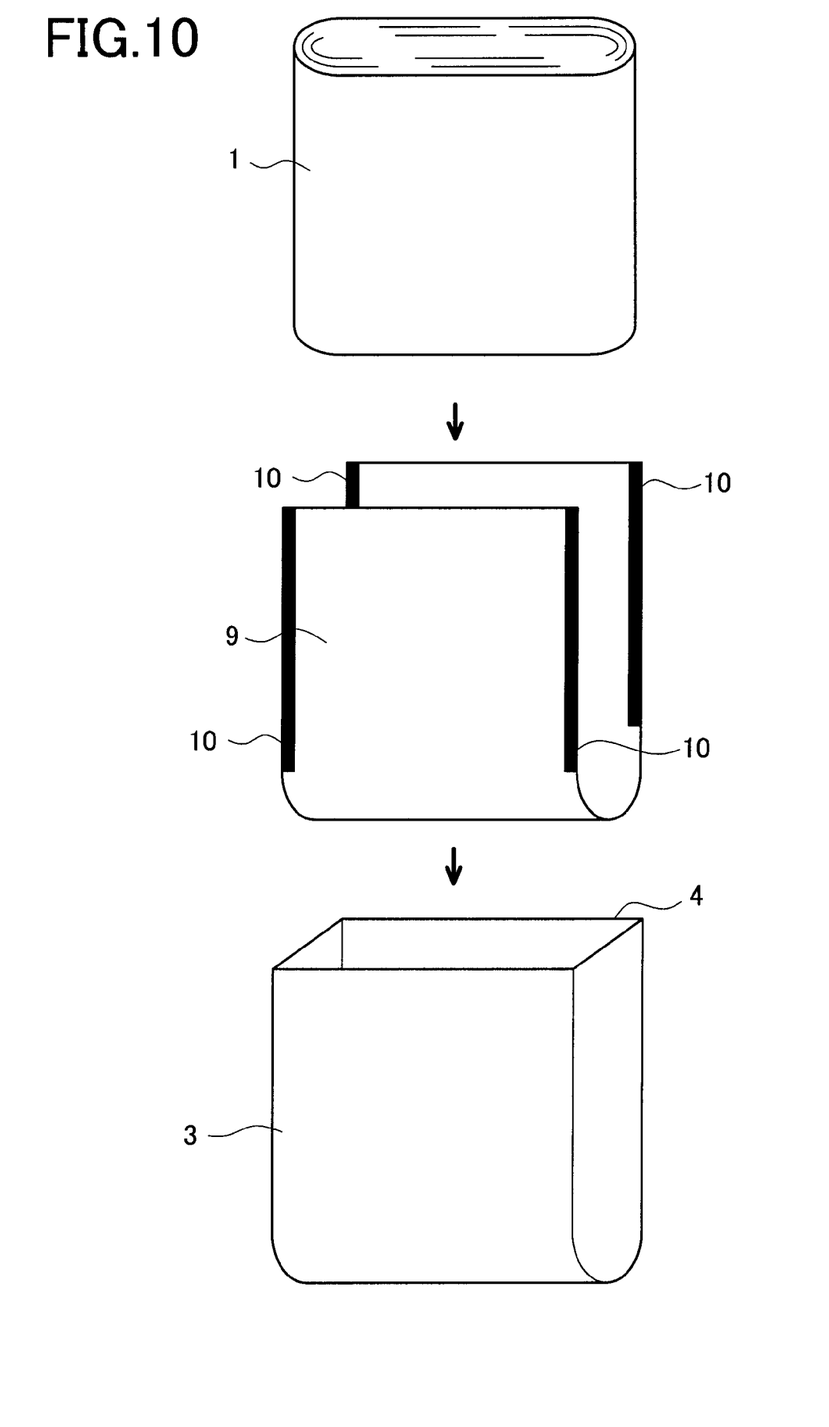
FIG. 10 is an exploded perspective view of a secondary battery of another example.

The secondary battery in this embodiment may be configured as shown in FIG. 10. A secondary battery in FIG. 10 is configured such that the orientation of the wound electrode body 1 to be inserted in the case 3 is different from that in FIG. 1. In association with this, the locations of thick portions 10 in a film 9 are different from the thick portions 5. However, as with the thick portions 5, each thick portion 10 is also located at a boundary region between the flat portion 11 and the curved portion 12 of the outer shape of the wound electrode body 1 when the film 9 is set in the secondary battery.

Figure 11:
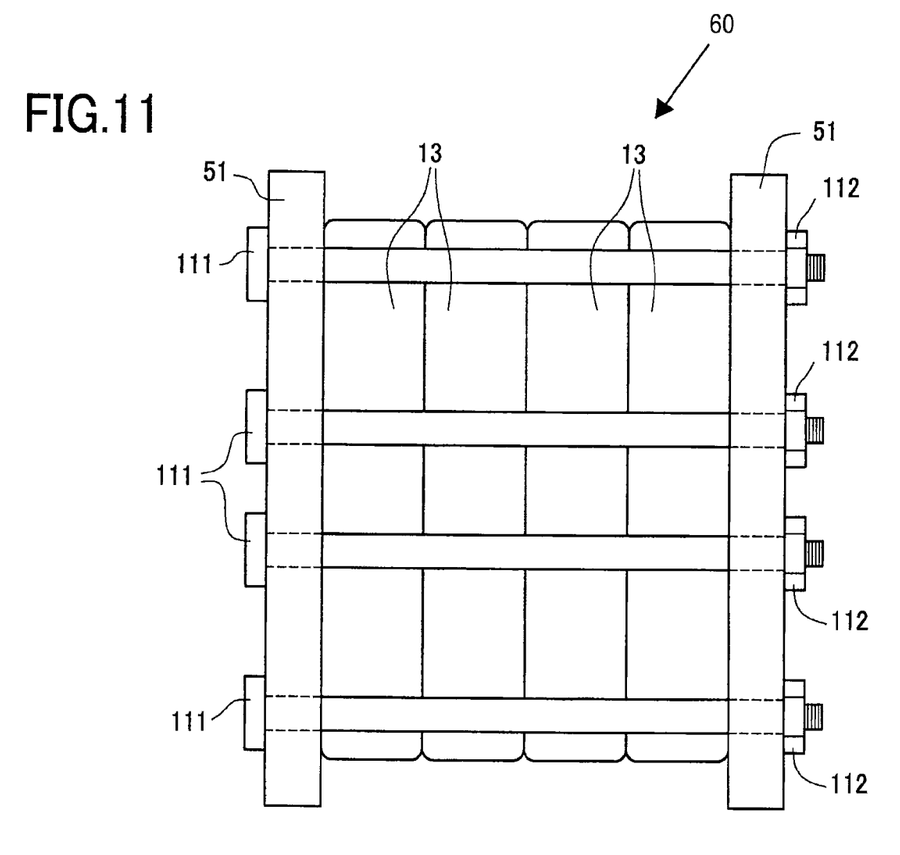
FIG. 11 is a view of a battery assembly including the secondary battery of the embodiment.

The secondary battery in this embodiment can be used as a battery assembly 60 shown in FIG. 11. The battery assembly 60 in FIG. 11 includes a plurality of secondary batteries 13 each corresponding to the aforementioned secondary battery of this embodiment, sandwiched between pressing members 51 and tightened by bolts 111 and nuts 112. This tightening exerts binding load on each of the secondary batteries 13. Each pressing member 51 actually has the shape of comb teeth. The secondary batteries 13 are generally connected to each other in series. Even in each secondary battery 13 of this battery assembly 60, each thick portion of the film exerts sufficient load on the wound electrode body as mentioned above. Thus, the inherent power generation capability of the entire battery assembly 60 can be exhibited sufficiently.

In FIG. 11, the pressing members 51 are placed only at both ends, but they may be additionally disposed between the secondary batteries 13. In the battery assembly 60 shown in FIG. 11, it is most preferable to provide the thick portions in the films of all the secondary batteries. As an alternative, the thick portions may be provided in the films of some of the secondary batteries. This can also provide the effect by just that much.

Figure 12:
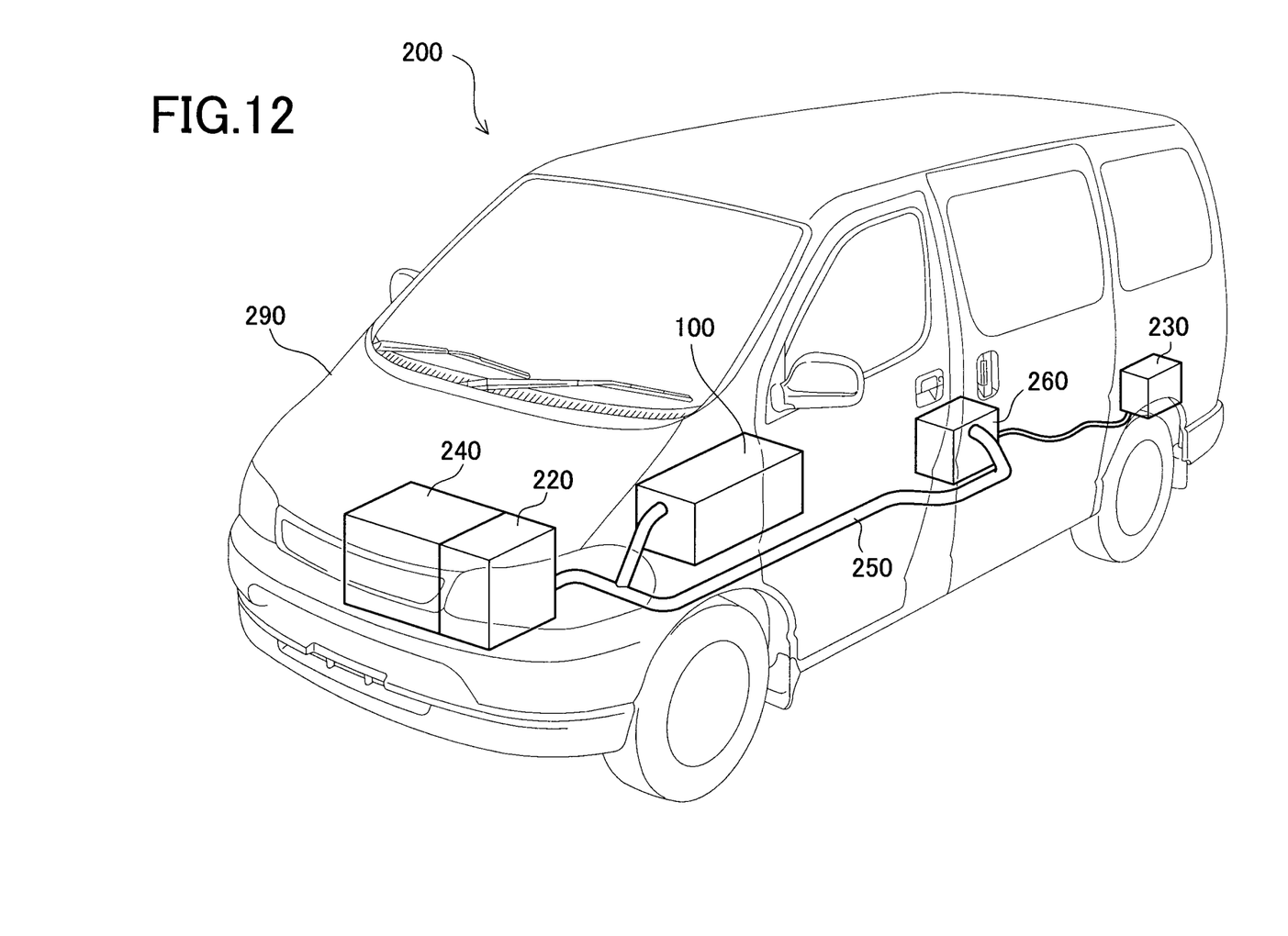
FIG. 12 is a perspective view of a vehicle equipped with the battery assembly including the secondary battery.

The secondary battery or the battery assembly in the present embodiment can be used as a power source in a vehicle 200 as shown in FIG. 12. The vehicle 200 is a hybrid electric vehicle to be driven by a combination of an engine 240, a front motor 220, and a rear motor 230. This vehicle 200 includes a vehicle body 290, the engine 240, the front motor 220, the rear motor 230, a cable 250, an inverter 260, and a battery pack 100. The battery pack 100 contains the battery assembly 60 shown in FIG. 11. The battery assembly 60 is constituted of the secondary batteries 13 of the present embodiment. Even in such vehicle 200, the presence of the thick portions in the film in each secondary battery can sufficiently exhibit inherent power generation capability of the battery pack 100.

It is to be noted that the vehicle may be a vehicle to be driven by a driving power source entirely or partially using electric energy from a battery. The number of wheels is not particularly limited. For instance, the vehicle may include an electric vehicle, a hybrid electric vehicle, a plug-in hybrid electric vehicle, a hybrid railway vehicle, a forklift, an electric wheelchair, an electrically assisted bicycle, an electric scooter, etc. Furthermore, the vehicle also may include a vehicle using electric energy from a battery as only a power source for in-vehicle electric devices or using a secondary battery singly, not as a battery assembly.

Figure 13:
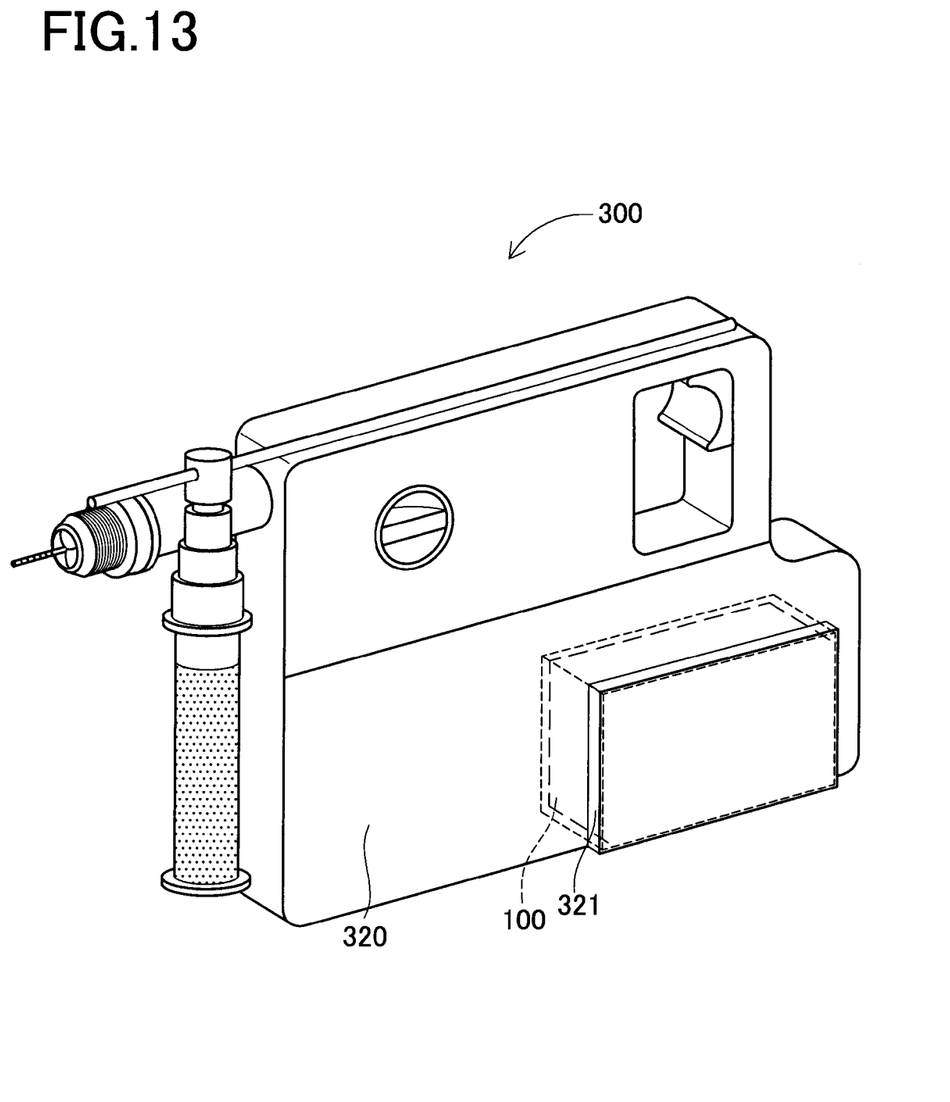
FIG. 13 is a perspective view of a hammer drill mounting the secondary battery or the battery assembly.

The secondary battery or the battery assembly in the present embodiment may be used as a power source for a battery mounting device as shown in FIG. 13. FIG. 13 shows a hammer drill 300 equipped with the battery pack 100. The hammer drill 300 is a battery mounting device including a main body 320 and the battery pack 100. The battery pack 100 in the hammer drill 300 is removably mounted on a bottom 321 of the main body 320. Even in this hammer drill 300, the thick portions of the film in each secondary battery can sufficiently exhibit power generation capability of the battery pack 100.

The battery mounting device is a device equipped with a battery to be utilized as at least one of energy sources. For example, there are a personal computer, a cell phone, an electric battery-driven tool, an uninterruptible power supply system, various electric battery-driven home appliances, office equipment, industrial equipment, etc. The battery mounting device may include a device using a secondary battery singly, not a battery assembly.

As described in detail above, the secondary battery 13 or the battery assembly 100 of the present embodiment includes the thick portions 5 in the film 2. Each thick portion 5 is located at the boundary region between each flat portion 11 and each curved portion 12 defining the outer shape of the wound electrode body 1. Thus, the secondary battery in which load is applied well on the wound electrode body and capable of sufficiently providing inherent power generation capability.

The above embodiment is a mere example and is not intended to limit the scope of the disclosure. The present invention may be embodied in other specific forms without departing from the essential characteristics thereof. For instance, the film having the thick portions may be replaced with a combination of a single member having only a thick portion and a flat film having no thick portion. In this case, if the hard case has at least an insulating inner surface, a film is not necessary. Furthermore, the present invention may be applied to secondary batteries other than the lithium ion secondary battery.

In the above embodiment, the electrode body is embodied as the wound electrode body 1 formed of the electrode sheets and others wound in flat form, but not limited thereto. The electrode body may be an electrode body having an elliptic cross section or an oval cross section and an electrode body of piling-up type, not winding type. In these cases, it is preferable to previously examine a distribution of binding load on an electrode body and dispose a compressing member having a desired size in a needed place.

Preferably, the secondary battery of the invention further comprises a film sandwiched between the inner surface of the flat-type case and the electrode body, and the film is partially formed with a thick portion thicker than other portions of the film. In this case, the thick portion serves as the compressing member.

Preferably, the surface of the electrode body includes a flat portion and a curved portion, and the compressing member or the thick portion is located at a boundary region between the flat portion and the curved portion of the surface of the electrode body. In the electrode body, the portion of the curved portion adjoining to the flat portion has a shorter distance to the inner surface of the flat-type case. Therefore, the compressing member or the thick portion reliably presses the electrode body. This makes it sure to apply pressing load on not only the flat portion of the electrode body but also at least part of the curved portion.

In the invention, further preferably, the electrode body is a wound electrode body formed of electrode sheets wound in flat form. In the battery using the flat wound electrode body, specifically, it is significant to apply load on a wider area by the compressing member.

Moreover, the invention is also applied to a battery assembly comprising a plurality of the secondary batteries and a pressing member that presses the secondary batteries from outside, the secondary batteries being assembled and pressed in a direction of thickness of the electrode bodies by the pressing member.

The invention is also applied to a vehicle equipped with a secondary battery, the secondary battery comprising: an electrode body; a flat-type case that houses the electrode body; and a compressing member that is placed between an inner surface of the case and the electrode body and presses part of a surface of the electrode body.

Reference Signs List

1 Wound electrode body
2 Film
3 Hard case
5 Thick portion (Compressing member)
9 Film
10 Thick portion (Compressing member)
11 Flat portion
12 Curved portion
13 Secondary battery
51 Pressing member
200 Vehicle
300 Hammer drill

The invention claimed is:

1. A secondary battery comprising:
an electrode body;
a flat case that houses the electrode body;
a compressing member that is a thick portion located between an inner surface of the case and the electrode body and presses part of a surface of the electrode body; and
a film sandwiched between the inner surface of the flat case and the electrode body, wherein the film is partly formed with the thick portion thicker than other portions of the film,
wherein the surface of the electrode body includes a flat portion and a curved portion, and the compressing member is located at a boundary region between the flat portion and the curved portion of the surface of the electrode body.

2. The secondary battery according to claim 1, wherein the electrode body is a wound electrode body formed of electrode sheets wound in flat form.

3. A battery assembly comprising a plurality of secondary batteries each including
an electrode body,
a flat case that houses the electrode body,
a pressing member that presses the secondary batteries from outside, the secondary batteries being assembled and pressed in a direction of thickness of the electrode bodies by the pressing member,
wherein at least one of the secondary batteries includes a compressing member that is a thick portion located between an inner surface of the flat case and the electrode body and compresses part of the surface of the electrode body, and
a film sandwiched between the inner surface of the flat case and the electrode body, wherein the film is partly formed with the thick portion thicker than other portions of the film,
wherein the surface of the electrode body includes a flat portion and a curved portion, and the compressing member is located at a boundary region between the flat portion and the curved portion of the surface of the electrode body.

4. A vehicle equipped with a secondary battery, the secondary battery comprising:
an electrode body;
a flat case that houses the electrode body;
a compressing member that is a thick portion placed between an inner surface of the case and the electrode body and compresses part of a surface of the electrode body; and
a film sandwiched between the inner surface of the flat case and the electrode body, wherein the film is partly formed with the thick portion thicker than other portions of the film,
wherein the surface of the electrode body includes a flat portion and a curved portion, and the compressing member is located at a boundary region between the flat portion and the curved portion of the surface of the electrode body.

* * * * *